(12) United States Patent  
Tsanev et al.

(10) Patent No.: US 8,416,350 B2  
(45) Date of Patent: Apr. 9, 2013

(54) DETACHABLE SCREEN GUARD ASSEMBLY AND METHOD FOR SECURING A SCREEN PROTECTOR

(76) Inventors: Tihomir Tsanev, Bentonville, AR (US); Maria Dimitrova Tsaneva, Ruse (BG); Detelina Todorova Tsaneva, legal representative, Ruse (BG); Hristo Todorov Tsanev, legal representative, Schiller Park, IL (US)

( * ) Notice: Subject to any disclaimer, the term of this patent is extended or adjusted under 35 U.S.C. 154(b) by 0 days.

(21) Appl. No.: 13/352,567

(22) Filed: Jan. 18, 2012

(65) Prior Publication Data

US 2012/0113512 A1 May 10, 2012

Related U.S. Application Data

(63) Continuation-in-part of application No. 12/698,117, filed on Feb. 1, 2010, now abandoned.

(51) Int. Cl.
*H04N 5/64* (2006.01)
*G03B 21/56* (2006.01)
*G02B 27/00* (2006.01)

(52) U.S. Cl.
USPC ............ 348/841; 359/461; 359/601; 359/609

(58) Field of Classification Search .................... 348/841
See application file for complete search history.

(56) References Cited

U.S. PATENT DOCUMENTS

| 4,427,264 A | 1/1984 | Kamerling |
| 4,712,870 A | 12/1987 | Robinson |
| 4,819,085 A | 4/1989 | Liang |
| 4,834,330 A | 5/1989 | Swillinger |
| 4,863,242 A | 9/1989 | Correa |
| 4,865,420 A * | 9/1989 | Schmidt .................. 359/601 |
| 4,907,090 A | 3/1990 | Ananian |
| 5,204,750 A | 4/1993 | Ferraroni |
| 5,448,405 A | 9/1995 | Clausen |
| 5,668,612 A | 9/1997 | Hung |
| 5,971,548 A | 10/1999 | Hung |
| 6,125,525 A | 10/2000 | Brock |
| 6,469,752 B1 | 10/2002 | Ishikawa |
| D504,899 S | 5/2005 | Ellis |
| 6,967,635 B2 | 11/2005 | Hung |
| 7,226,176 B1 * | 6/2007 | Huang .................. 359/609 |
| 7,292,435 B2 | 11/2007 | She |
| 7,352,507 B2 | 4/2008 | Sample |
| 2007/0121209 A1 * | 5/2007 | Liang et al. .................. 359/461 |

* cited by examiner

*Primary Examiner* — Christopher S Kelley  
*Assistant Examiner* — Hee-Yong Kim

(57) ABSTRACT

A detachable screen guard assembly mounted on a screen frame of a monitor comprising a screen protector and a fastening apparatus. The screen protector is transparent and made of glass, acrylic, or plastic having excellent transparency.

The fastening apparatus includes at least one couple of a hooking member and a bracket member. The bracket member is mounted on the screen frame and the hooking member is mounted on the screen protector. The hooking member attaches mechanically to the bracket member. Because the hooking member can be disengaged from the bracket member, the screen protector can be detached from the screen frame to be cleaned or mounted on another monitor that has a bracket member installed.

The invention also includes a method for securing a screen protector to a monitor by strapping the screen protector to the monitor support.

16 Claims, 5 Drawing Sheets

12/698,117 filed Feb. 1, 2010 now abandoned where claims 1 through 14 were allowed and are being repeated herein

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates generally to screen protective devices and more particularly to a detachable screen guard assembly for protecting a screen and mounted on a screen frame of an image display device.

2. Description of the Related Art

A great majority of the increasingly popular flat-screen monitors and flat-screen televisions have substantially fragile screens that need to be protected from accidental damage. In addition to the propensity of the screen being damaged, a screen protective device may benefit a viewer by reducing glare and radiation emitted by the screen.

A conventional screen protective device on the market is a hanging-type screen protective glass or plastic that in some cases is strapped to a monitor. This type of device, when hanging on top of a frame of a monitor, produces an inharmonious appearance to the monitor. Moreover, the hanging-type screen protective device utilizing two straps each connected to the top and the bottom of the screen protective device. These type devices have high manufacturing cost that makes it unaffordable for many users.

There are a number of previously developed screen protective devices that do not solve all challenges posed by the broad use of such devices with an existing monitor. Since a screen protective device is generally targeted for use by a broad consumer base, the installation process should be easy to perform even by an unskilled individual. In addition, the screen protective device should be easily detachable for cleaning. Further, the screen protective device should fit a wide range of presently manufactured monitors and should have low manufacturing cost.

Another screen protective device on the market is a thin protective membrane made of acrylic that directly attaches to a screen of a monitor. This type of protective device provides limited protection since it cannot prevent damage in case of substantial impact. In addition, it is hard to install on large size screens.

To overcome the shortcomings, the present invention provides detachable screen guard assembly to mitigate and obviate the above mentioned drawbacks.

SUMMARY OF THE INVENTION

The primary objective of the present invention is to provide a detachable screen guard assembly for protecting the screen of an existing monitor. The drawbacks in the prior art and the conventional screen protective devices are overcome by the present invention as described below.

To achieve the objective, a detachable screen guard assembly mounted on a screen frame of a monitor comprising a screen protector and a fastening apparatus. The screen protector is transparent and made of glass, acrylic, or plastic having excellent transparency.

The fastening apparatus includes at least one couple of a hooking member and a bracket member. The bracket member is mounted on the screen frame and the hooking member is mounted on the screen protector. The hooking member attaches mechanically to the bracket member. Because the hooking member can be disengaged from the bracket member, the screen protector can be detached from the screen frame to be cleaned or mounted on another monitor that has a bracket member installed.

The present invention can be manufactured cost efficiently and can easily be installed on a monitor by an unskilled individual. The detachable screen guard assembly conveniently attaches to a monitor completely protects the screen and keeps the monitor neat in appearance. Once installed, the fastening apparatus allows the screen protector to be detached from and position-adjusted with respect to the monitor. In addition, once installed on the monitor, the detachable screen guard assembly can easily be entirely removed without leaving marks or damaging the monitor.

In addition, the current invention includes a securing device that utilizes a new and innovative method for securing a screen protector on an image display device. The method involves strapping the screen protector to the monitor support. This is a significantly more cost efficient method compared to any known methods for securing a screen protector to a monitor using straps. Further, this method allows for fewer connection points between the securing device and the screen protector compared to traditionally available securing devices. Provided that most connection points are exposed, reducing their number significantly improves the viewing experience of the viewer.

The securing device offers tremendous versatility and is significant improvement over the prior art securing the screen protector to a monitor in a completely new way that was never thought or suggested in the past.

Many other advantages and features of the present invention will become manifest to those versed in the art upon making reference to the detailed drawings in which a preferred structural embodiment incorporating the principles of the present invention is shown by way of illustrative example.

DETAILED DESCRIPTION OF THE INVENTION

Figure 1:
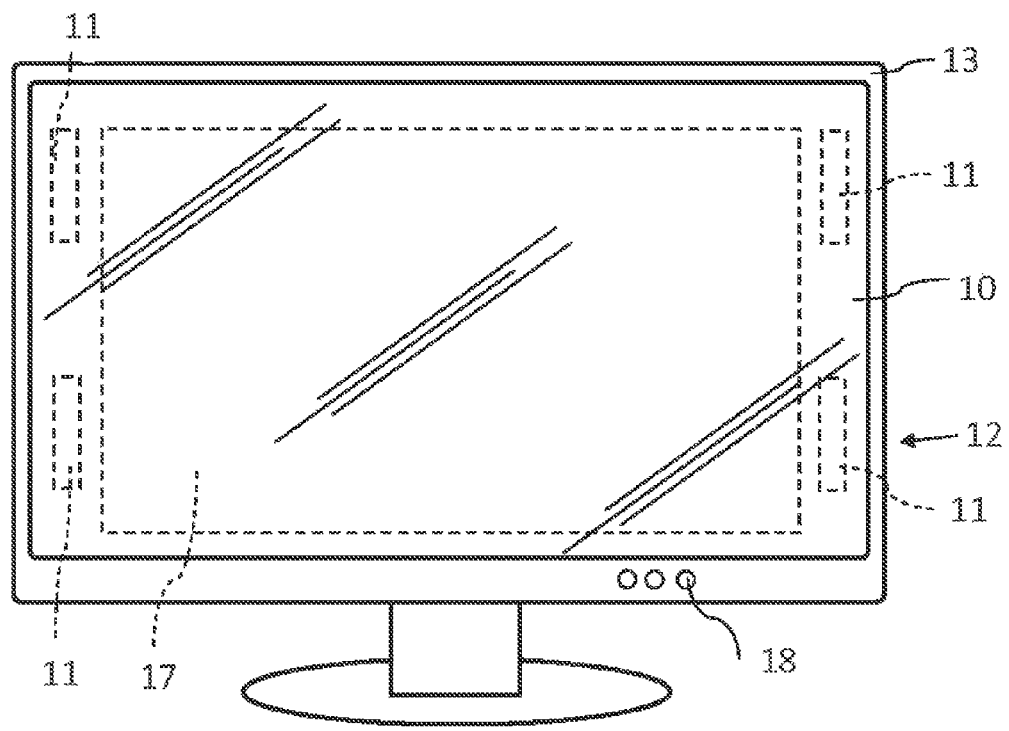
FIG. 1 is an operational front view of the detachable screen guard assembly mounted on a monitor.
Figure 4:
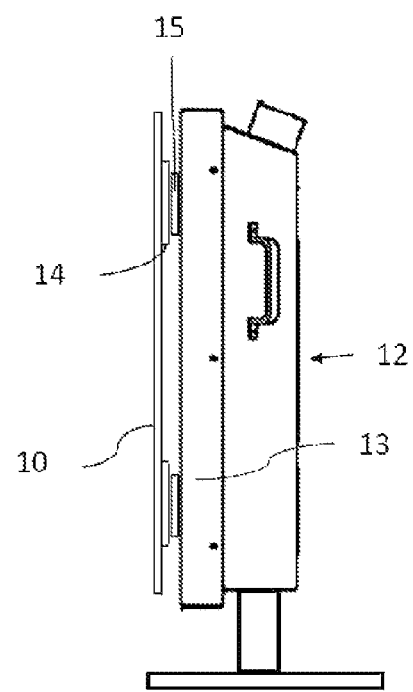
FIG. 4 is an operational side view of the detachable screen guard assembly mounted on a monitor.

With reference to FIGS. 1 and 4, a detachable screen guard assembly in accordance with the present invention is mounted on a screen frame (13) of a monitor (12) to protect a screen (17) of the monitor (12) and has a screen protector (10) and a fastening apparatus (11).

The screen protector (10) is transparent and made of glass, acrylic, or plastic having excellent transparency. Preferably, the screen protector (10) further has anti-glare and anti-radiation efficiencies to reduce a potentially harmful radiation and make users feel comfortable when they use the monitor (12). It is to be understood that other materials may be used in so far as they provide easy viewing of the screen (17).

The screen protector (10) is mounted detachably in front of the monitor (12) and is constructed preferably in generally a rectangular shape. However, it is to be understood that such shape may be sized according to the shape and size of the monitor (12) on which it is to fit.

Additionally, the size of the screen protector (10) is ideally diminished to not cover parts of the monitor (12), and controlling buttons (18) when present on the front surface of the screen frame (13). Therefore, appearance of the monitor (12) is kept original and the controlling buttons (18) are operated as usual without obstruction. Moreover, the screen protector (10) with the fastening apparatus (11) has a simple structure so that the manufacturing cost of the detachable screen guard assembly is decreased.

Further, in a preferred embodiment, the screen protector (10) has finished edges and rounded corners for improved appearance and to prevent injuries by accidental scraping or cutting of the user when working around the monitor. However, it is to be understood that such rounding of the corners of the screen protector (10) is for ergonomic reasons and that the corners may be shaped differently depending on various factors. In another embodiment (not shown), the screen protector (10) has a frame that improves appearance, holds the screen protector (10), or connects to the fastening apparatus (11).

The fastening apparatus (11) is mounted on the screen frame (13), detachably fastens the screen protector (10) in front of the monitor (12), and has one or multiple couples of a bracket member (15) and a corresponding detachable hooking member (14). With reference to FIG. 1, in the preferred embodiment, the fastening apparatus (11) comprises of four couples of the bracket member (15) and the hooking member (14). Moreover, the bracket member (15) and the hooking member (14) may be in different shapes and sizes, and may have different positioning on the screen frame (13) and the screen protector (10) respectively.

Figure 2:
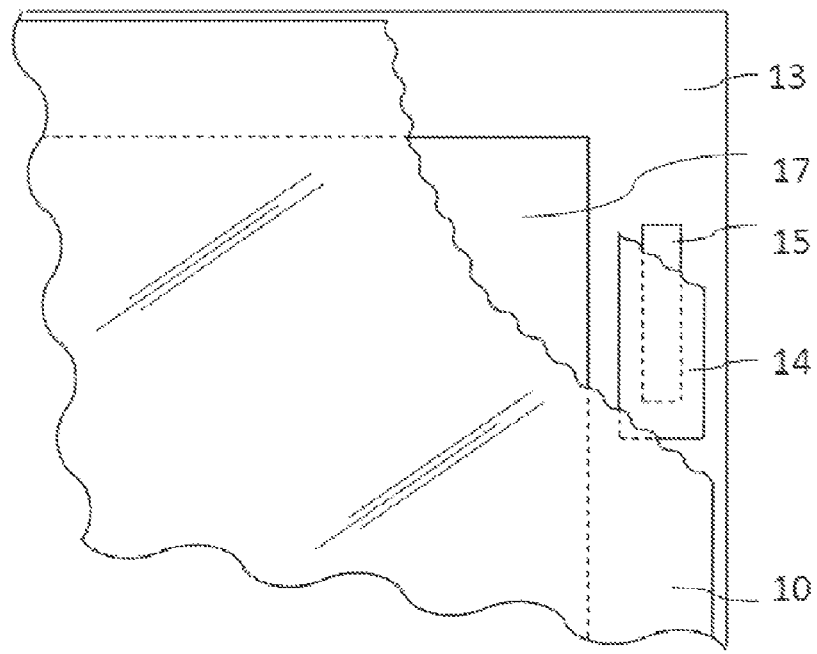
FIG. 2 is a fragmentary detail view of the detachable screen guard assembly mounted on a monitor.
Figure 3:
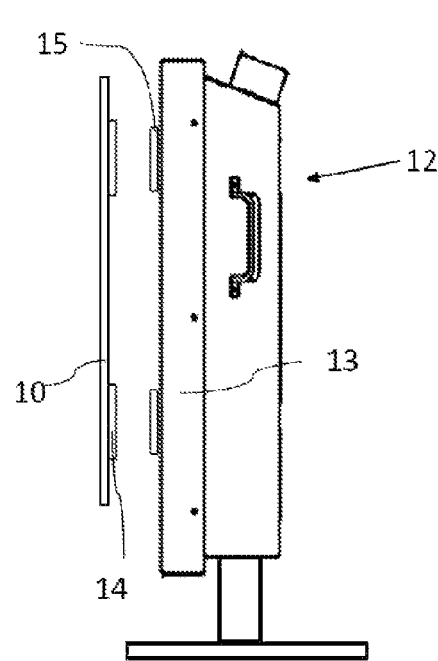
FIG. 3 is a side view of the detachable screen guard assembly temporary detached from a monitor on which it is installed.

With reference to FIGS. 2, 3 and 4, the bracket member (15) is mounted on the surface of the screen frame (13) and has a front surface and a rear surface. The rear surface of the bracket member (15) connects to and is mounted on the surface of the screen frame (13) by removable adhesive tape. In addition, the bracket member (15) can be constructed such that it snaps on/off to the screen frame (13) or such that it is mounted on the surface of the screen frame (13) by glue or an adhesive tape. In the preferred embodiment, the bracket member (15) attaches to the screen frame (13) by adhesive attachment strips that can be easy to remove without leaving marks. The attachment strips may utilize removable or semi-permanent adhesive that can be removed without leaving marks or causing damage on the screen frame (13).

The hooking member (14) is mounted on the surface of the screen protector (10) and has a front surface and a rear surface. The rear surface of the hooking member (14) connects to and is mounted on the surface of the screen protector (10) by glue or an adhesive tape. In addition, the hooking member (14) can be constructed such that it is integrally connected to the screen protector (10), or such that it snaps on/off to the screen protector (10).

The front surface of the hooking member (14) and the front surface of the bracket member (15) are formed to be mechanically interlockable, whereby when the hooking member (14) and the bracket member (15) are interlocked the screen protector (10) is mounted on the monitor (12). Because the hooking member (14) is detachable from the bracket member (15), so the screen protector (10) can be detached from the screen frame (13). In addition, the hooking member (14) and the bracket member (15) can be constructed such that the hooking member (14) snaps on/off to the bracket member (15), or the hooking member (14) connects with the bracket member (15) through reclosable fastener, or other mechanical device.

When the detachable screen guard assembly is installed on the monitor (12), the fastening apparatus (11) allows the screen protector (10) to be adjusted horizontally and vertically with respect to the monitor (12) and the screen frame (13). With reference to FIG. 2, in the preferred embodiment, the hooking member (14) and the bracket member (15) attach together mechanically through reclosable fasteners. Further, the size of the hooking member (14) is larger than the size of the bracket member (15). Therefore, the hooking member (14) can be repositioned with respect to the bracket member (15), and thus the screen protector (10) can be adjusted with respect to monitor (12) and the screen frame (13).

The detachable screen guard assembly may be used on any suitable image display device, including but not limited to rear projection display monitors, front projection display devices, flat screen televisions, various LCD, LED and plasma displays. The monitor (12) may be constructed as a wall mounted or ceiling mounted monitor (not shown), or be constructed as a laptop or desktop computer monitor.

In the preferred embodiment, the color of the hooking member (14) approximately matches the color of the screen frame (13). In addition, in the preferred embodiment, the fastening apparatus (11) allows for approximately 3 millimeters gap between the screen frame (13) and the screen protector (10). The gap allows air to flow between the screen frame (13) and the screen protector (10) and thus prevents overheating of the screen (17). In another embodiment (not shown), paint or other means can be applied on the screen protector (10) to conceal the fastening apparatus (11) from a viewer.

Figure 5:
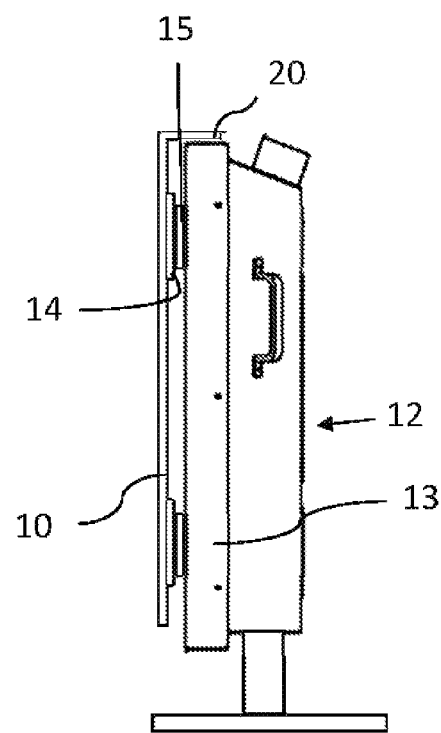
FIG. 5 is an operational side view of the detachable screen guard assembly mounted on a monitor and including an element resting on the top of the monitor.

In another embodiment (FIG. 5), the screen protector (10) has a horizontal flat element (or elements) (20) attached to the top of the screen protector (10) that may be positioned with its flat surface being perpendicular to the surface of the screen protector (10). The flat element (20) may have the same thickness as the screen protector (10) and can be made of similar material. The flat element can rest on the top of the monitor (12) and provide additional support for the screen protector after installation on the monitor (12). The flat element (20) can be attached to the screen protector (10) with fixtures or molded on the screen protector, or made an integral part of the screen protector (FIG. 5).

Figure 6:
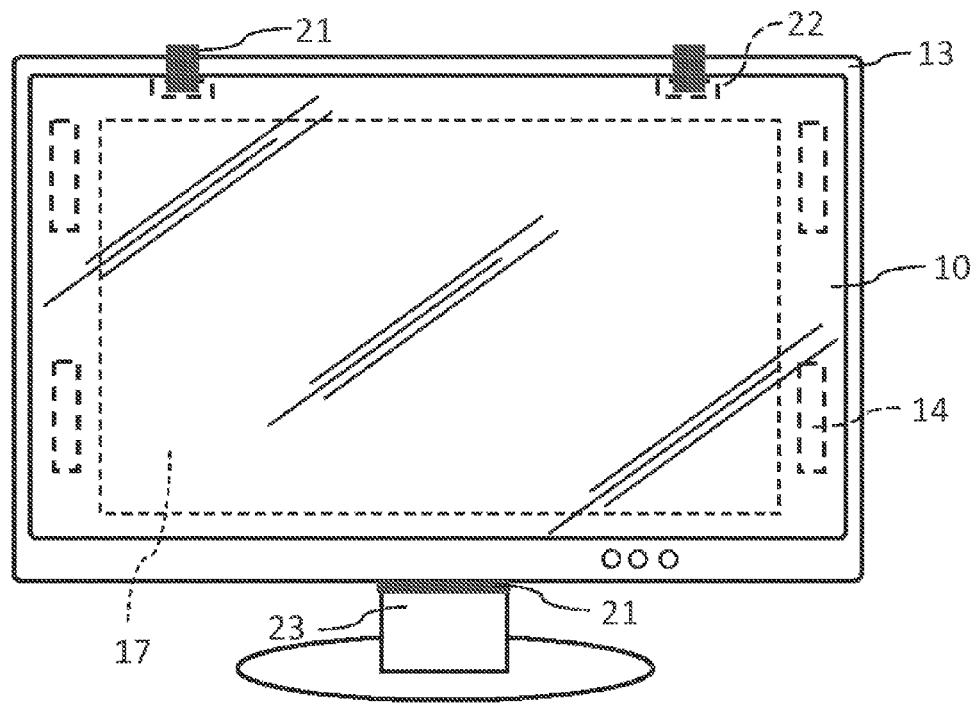
FIG. 6 is an operational front view of the detachable screen guard assembly mounted on a monitor and secured with a securing device to prevent accidental fall of the screen protector.
Figure 7:
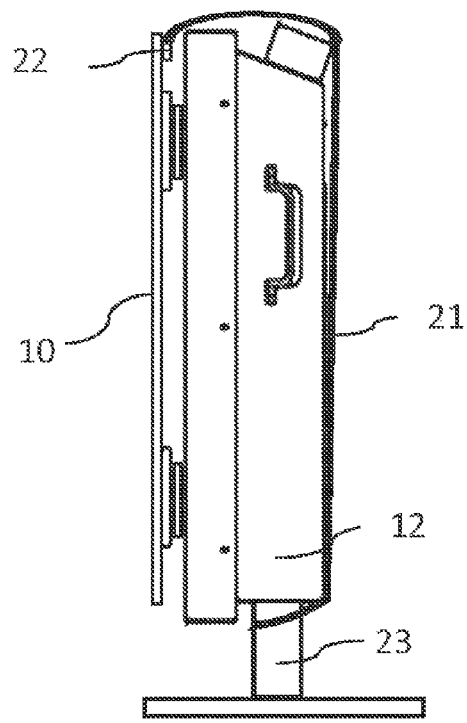
FIG. 7 is an operational side view of the detachable screen guard assembly mounted on a monitor and secured with a securing device to prevent accidental fall of the screen protector.
Figure 8:
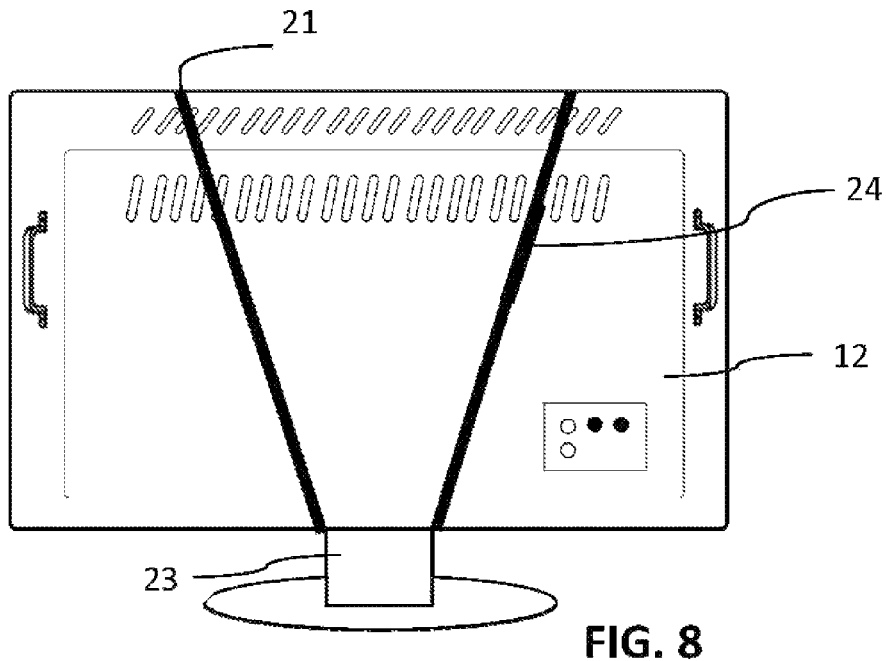
FIG. 8 is an operational back view of the monitor protected with a screen protector that is secured with a securing device to prevent accidental fall of the screen protector.

In yet another embodiment, the screen protector has a securing device (FIGS. 6, 7 and 8) that is designed to secure a screen protector to an image display device. The securing device is designed to provide a means for preventing a screen protector from coming apart from the monitor after installation. The securing device can be used with the screen protector (10) that is a part of the detachable screen guard assembly described herein as well as other screen protectors from the field of screen protective equipment. The securing device comprises flexible strap(s) (21) and a connection apparatus (24), where the connection apparatus can be replaced with simple mechanical connection.

In the preferred embodiment, the securing device has two flexible straps (21) and a connection apparatus (24). Although, in the preferred embodiment the flexible straps are made of nylon they can also be made of other materials including but not limited to: polyester, copper (or other metals), rubber, plastic etc. the straps can also be elastic. Each of the two straps has two ends the first end is connected to the screen protector through adhesive strips (22) (FIGS. 6 and 7), screws or rivets, or a loop that goes through an opening(s) drilled into the screen protector. There are other mechanical ways of securing the straps (21) to the screen protector (10). The second end of each strap (21) is connected to the connection apparatus (24) through stitching or other mechanical connection.

The connection apparatus (24) is designed to connect the two straps together. The connection apparatus may be designed to adjust the overall length of the securing device. In the preferred embodiment, the connection apparatus (24) comprises reclosable fastener that has a hook member and a loop member. The hook member is affixed to the first strap and the loop member is affixed to the second strap. When the hook member is connected with the loop member the connection apparatus is engaged. When the connection apparatus (24) is engaged the screen protector (10) is secured to the monitor (12) on which it is installed. The connection apparatus can be designed in other ways. For example, the connection apparatus can utilize a buckle that may allow the strap(s) to be connected and also adjusted in length.

Figure 10:
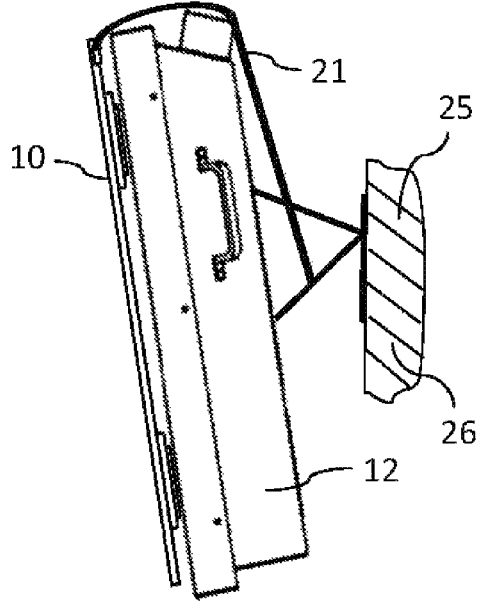
FIG. 10 is an operational side view of the detachable screen guard assembly mounted on a monitor that is installed on a wall and secured with a securing device to prevent accidental fall of the screen protector.

The securing device secures the screen protector (10) to the monitor (12) by running across the monitor top then on the back of the monitor and around the stand (23) or the wall mount (25) that supports the monitor (12) (FIG. 10). The securing device is designed to be strong enough to hold the weight of the screen protector (10). Thus the securing device prevents an accidental fall of the screen protector (10) from the monitor (12).

Alternatively, the securing device can be designed so that the connection apparatus is omitted and it comprises only one strap both ends of which are directly connected to the screen protector and designed to secure the screen protector to the monitor stand or mount.

Figure 9:
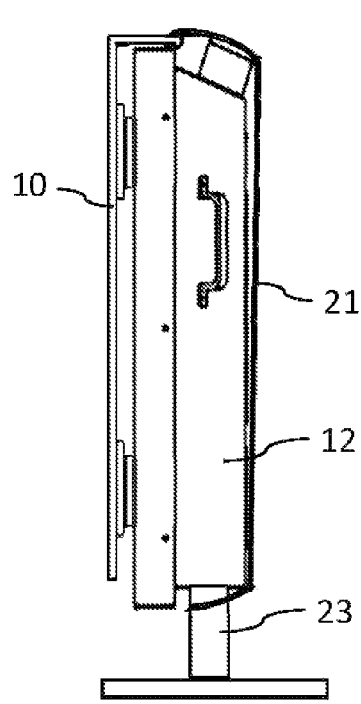
FIG. 9 is an operational side view of the detachable screen guard assembly, utilizing an element connected to the top of the screen protector, where the detachable screen guard assembly is mounted on a monitor and secured with a securing device to prevent accidental fall of the screen protector.

The securing device can also be used with the screen protector embodiment that has the previously mentioned flat element (20) attached to the top of the screen protector (10). In this embodiment the strap can be attached to the flat element (20) that is connected to the screen protector (10) (FIG. 9).

Figure 11:
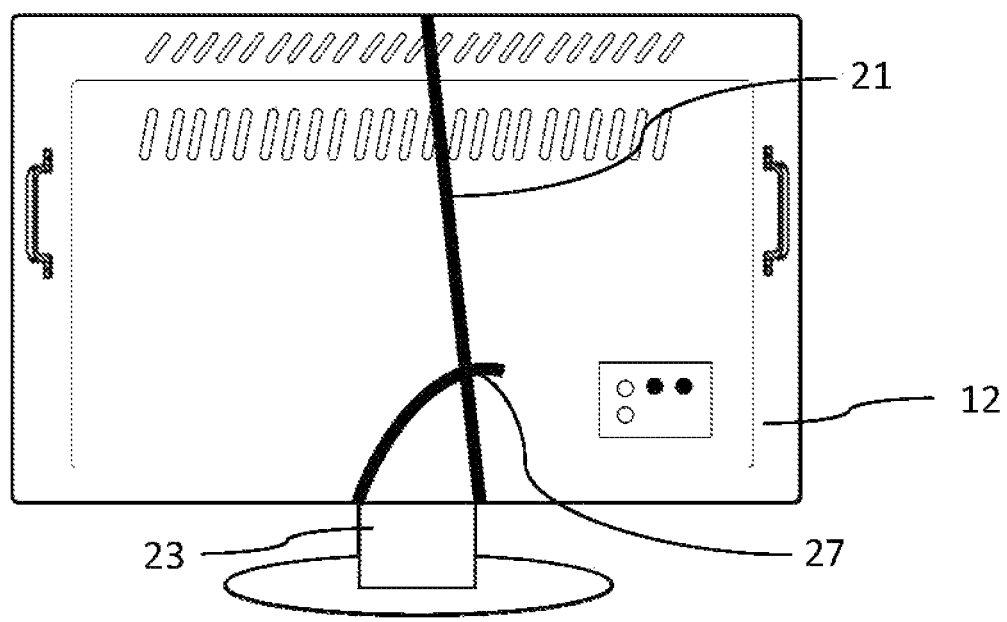
FIG. 11 is an operational back view of the monitor protected with a screen protector that is secured with a one-strap securing device to prevent accidental fall of the screen protector.

In another embodiment (FIG. 11), the securing device comprises one strap (21) and a connection apparatus (27). The first end of the strap is affixed to the top of the screen protector and the second end of the strap is attached to the strap itself through a connection apparatus (27) or other mechanical connection. In this embodiment, the only strap of the securing device runs across the monitor top then on the back of the monitor and around the stand (23), forming a loop around the stand (23) (or the wall mount) on which the monitor is mounted. The connection apparatus (27) comprises reclosable fastener that has a hook member and a loop member. The hook member is affixed to the second end of the strap (21) and the loop member is affixed to the middle portion of the only strap (21). When the hook member is connected with the loop member the connection apparatus is engaged. When the connection apparatus (28) is engaged the securing device prevents an accidental fall of the screen protector from the monitor (12). In this embodiment the connection apparatus may be omitted and the second end of the strap can be mechanically connected to the middle portion of the strap. Further, instead of affixing to the screen protector the only strap may be passed through an opening drilled through the screen protector and the connection apparatus may be adapted to connect the first end and the second end of the strap.

In yet another embodiment (not shown), the securing device comprises only one strap and a connection apparatus where one end of the strap connects to the screen protector (10) and the second end connects to the connection apparatus, which in turn is mechanically connected to the screen protector (10).

The securing device provides for a securing method for a screen protector that is far superior to the conventional methods of securing screen protector to a monitor because the new design allows for achieving securing the screen protector at a lower manufacturing cost.

Even though numerous characteristics and advantages of the present invention have been set forth in the foregoing description, together with details of the structure and function of the invention, the disclosure is illustrative only Changes may be made in detail, especially in matters of shape, size and arrangement of parts within the principles of the invention to the full extent indicated by the broad general meaning of the terms in which the appended claims are expressed.

The invention claimed is:

1. A detachable screen guard assembly adapted to be mounted on a screen frame of an image display device comprising:

a screen protector being optically transparent and physically rigid, sized to extend over a screen of the image display device;

a fastening apparatus adapted to be mounted on the screen frame of the image display device, detachably fastening the screen protector on the screen frame and having at least one couple of a bracket member and a detachable hooking member, wherein each one of the at least one bracket member has a front surface and a rear surface adapted to be connecting to and mounted on the screen frame by removable adhesive device, whereby said bracket member can be entirely removed from the screen frame without leaving marks or causing damage; each one of the at least one detachable hooking member corresponds to and faces a corresponding said bracket member, has a front surface and a rear surface adapted to be connecting to and mounted on the screen protector; the front surface of the hooking member and the front surface of the bracket member are formed to be mechanically interlockable, whereby when the hooking member and the bracket member are interlocked the screen protector is mounted on the image display device; and the hooking member and the bracket member can be interlocked in more than one position with respect to each other, allowing the screen protector to be adjusted with respect to the image display device.

2. The detachable screen guard assembly of claim 1, wherein the screen protector has finished edges or rounded corners for improved appearance or to prevent injuries to the user.

3. The detachable screen guard assembly of claim 1, wherein said screen protector, when attached to said image display device, is distanced from the screen frame, whereby air can flow between the screen protector and the image display device.

4. The detachable screen guard assembly of claim 1, wherein said image display device is a flat screen television or a computer monitor.

5. The detachable screen guard assembly of claim 1, wherein said screen protector further has a frame.

6. The detachable screen guard assembly of claim 1, wherein said screen protector further has a means of concealing said fastening apparatus, whereby said fastening apparatus remains hidden from a viewer of the image display device.

7. The detachable screen guard assembly of claim 1, wherein said screen protector further has an anti-glare efficiency.

8. The detachable screen guard assembly of claim 1, wherein the screen protector has efficiency to protect a viewer from the radiation emitted by the image display device.

9. The detachable screen guard assembly of claim 1, wherein each couple of the bracket member and the hooking member that is a part of the fastening apparatus comprises a reclosable fastener member mounted on the screen frame and adapted to mate with a second reclosable fastener member mounted on the screen protector.

10. The detachable screen guard assembly of claim 1, wherein the fastening apparatus is colored so that its color approximately matches the color of the screen frame.

11. The detachable screen guard assembly of claim 1, wherein the screen protector is made of acrylic or plastic.

12. The detachable screen guard assembly of claim 1, further including additional means of fastening to said image display device.

13. The detachable screen guard assembly of claim 1, wherein the screen protector and the fastening apparatus are decorated.

14. The detachable screen guard assembly of claim 1, wherein the screen protector shape is adjusted to better fit the display or provide access to display control means.

15. The detachable screen guard assembly of claim 1, further including an element or elements attached to the top of the screen protector where said element or elements provide additional support for the screen protector after installation on said image display device.

16. The detachable screen guard assembly of claim 1, further including a device that secures the screen protector to a support on which said image display device is mounted.

* * * * *